US007418974B2

(12) United States Patent
Kremer et al.

(10) Patent No.: US 7,418,974 B2
(45) Date of Patent: Sep. 2, 2008

(54) TAP HAVING A CLAMPING RING ON THE BASE END PORTION

(75) Inventors: Paul Kremer, Walferdange (LU); Paul Muzzo, Yutz (FR)

(73) Assignee: Luxembourg Patent Company S.A., Luxembourg (LU)

( * ) Notice: Subject to any disclaimer, the term of this patent is extended or adjusted under 35 U.S.C. 154(b) by 487 days.

(21) Appl. No.: 11/079,353

(22) Filed: Mar. 14, 2005

(65) Prior Publication Data

US 2005/0205821 A1 Sep. 22, 2005

(30) Foreign Application Priority Data

Mar. 16, 2004 (EP) ................................. 04101075

(51) Int. Cl.
*F16K 17/40* (2006.01)

(52) U.S. Cl. ................................ 137/68.14; 137/614.2

(58) Field of Classification Search ............. 137/68.14, 137/71, 312, 614.2
See application file for complete search history.

(56) References Cited

U.S. PATENT DOCUMENTS 1,136,606 A * 4/1915 Loyd et al. .................... 137/71
3,645,286 A * 2/1972 Follett ..................... 137/68.14
4,077,422 A * 3/1978 Brinkley et al. .......... 137/68.14
4,562,852 A * 1/1986 Britt ........................ 137/68.14
7,066,193 B2 * 6/2006 Aderholt et al. ............... 137/71
2004/0187921 A1 * 9/2004 Kremer et al. .......... 137/68.14

FOREIGN PATENT DOCUMENTS

FR 2602303 7/1986

* cited by examiner

*Primary Examiner*—John Rivell
(74) *Attorney, Agent, or Firm*—Polster, Lieder, Woodruff & Lucchesi, L.C.

(57) ABSTRACT

The invention relates to a tap for a gas or liquefied gas vessel having on a conical threaded base of the tap body a clamping ring adapted to be firmly tightened against a neck of the vessel to maintain a tight engagement of the threads of the base and the neck of the vessel in case of application of a strong impact force to the tap exteriorly of the vessel.

14 Claims, 1 Drawing Sheet

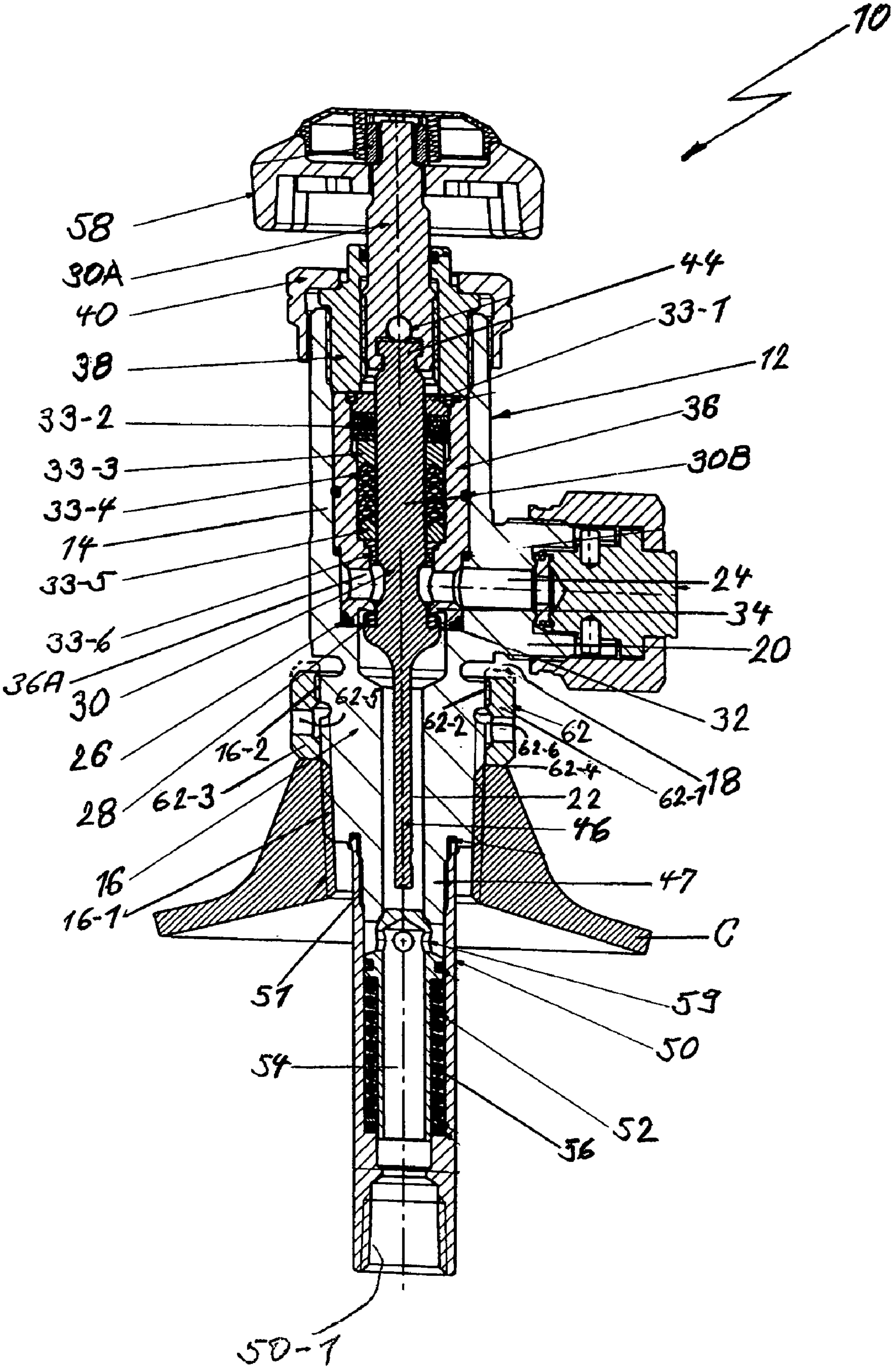
10
58
30A
40
38
33-2
33-3
33-4
14
33-5
33-6
36A
30
26
28
62-3
16-2
16
16-1
62-5
44
33-7
12
36
30B
24
34
20
32
62
62-2
62-6
62-4
62-1
18
22
46
47
C
51
59
50
54
52
56
50-1

TAP HAVING A CLAMPING RING ON THE BASE END PORTION

CROSS-REFERENCE TO RELATED APPLICATIONS

The present application is related to, and claims priority from, EP Application No. 04101075.2, filed on Mar. 16, 2004, and which is herein incorporated by reference.

STATEMENT REGARDING FEDERALLY SPONSORED RESEARCH

Not Applicable.

BACKGROUND OF THE INVENTION

The present invention relates to a tap for a gas, liquefied gas, or other fluid vessel, comprising a tap body having a main body portion and a base end portion provided with a first external thread for securing the tap to a neck opening of the vessel, and particularly to a tap having a clamping ring adapted to be firmly screwed down against a radial surface of the vessel neck surrounding the neck opening. The invention also concerns a method for securing a tap to a gas or fluid vessel, as well as a gas or fluid vessel having a tap of the type referred to.

In the state of the art the tap of a gas vessel is normally provided with a base end portion having an external conical thread engaged by application of a predetermined torque into a threaded opening of a gas vessel. The conical thread provides a tight connection between the base end portion of the tap and the vessel. If a high lateral or axial impact force is exerted to the tap, the base end portion may be deformed causing leakage through the threaded engagement between the base end portion and the opening of the vessel neck. Such leakage must be avoided especially for highly oxidant, reactive, corrosive, or toxic gases, used for example in the fabrication of microchips in the semiconductor industry. The known taps for gas vessels are usually provided with a single primary valve (single external closure) disposed within the tap body exteriorly of the gas vessel. If a high impact force is exerted to this known tap, for example in case of an accident of a vehicle wherein the vessel is transported, the portion of the tap body containing a primary valve may be sheared off and the gas may flow out freely through the gas passage of the base end portion which remains engaged in the vessel neck and, possibly also between the threads of the base end portion and the vessel neck, as referred to above.

It has already been proposed to provide a check valve below the base end portion and which is thus located within the interior of the vessel when the tap is secured thereto. This check valve may be a non-active check valve which closes only under the effect of the pressure of the fluid contained within the vessel in case the main portion of the tap body is sheared off. Also known are active check valves which close prior to each closure of the primary valve and which are positively opened after each opening of the primary valve. The taps provided with such a check valve and a primary valve are taps of double, internal and external, closures comprising the primary valve exteriorly of the vessel and the check valve interiorly thereof. Unfortunately these check valves can only prevent leakage of the contents of the vessel through the normal flow passage of the base end portion of the tap body remaining engaged within the opening of the vessel neck after the main portion of the tap body has been sheared off, but these check valves cannot prevent leakage through the engaged threads of the base end portion and the vessel neck in case of deformation of the base portion caused by the strong impact force applied to the tap.

Known in the prior art, such as French patent 2,602,303, is a seal ring disposed about the base end portion of the valve body and having O-rings engaging the fluid vessel and the tap body to provide an additional sealing means, but this seal ring cannot prevent damaging of the threaded engagement between the tap body and the vessel in case of application of a strong impact force applied to the tap.

BRIEF SUMMARY OF THE INVENTION

Briefly stated, the present invention provides an improved tap for a gas, liquefied gas or other fluid vessel, preventing leakage of the vessel contents through the threads of the base end portion and the vessel neck after application of a strong impact to the tap.

According to the invention there is provided on the base end portion of the tap body a second external thread between the first thread and the main portion of the tap body, and a clamping ring having an internal thread is in threaded engagement with the second thread, the clamping ring being adapted to be firmly tightened by application of a predetermined torque thereto against the vessel neck about the neck opening so as to maintain the integrity and the tightness of the threaded engagement between the base end portion and the vessel neck in case of application of a strong impact force to the tap body.

By the clamping ring forcefully tightened against the vessel neck the likelihood of deformation of the base end portion caused by a strong impact force applied to the tap body is substantially reduced. A portion of the energy of the impact force is diffused and transmitted from the clamping ring to the vessel neck about the neck opening so as to protect the threads and prevent deformation or damaging of the base end portion and the neck opening by shearing off of the threads of the base end portion and/or the neck opening. The tightness of the threaded engagement is accordingly maintained and the fluid contained in the vessel is sealed therein.

According to an advantageous feature of the invention, a weakening groove judiciously placed relative to the clamping ring may be formed in the tap body between the base end portion and the main portion of the tap body, approximately at the end of the clamping ring facing towards the main portion of the tap body. This optional groove defines a rupture zone and limits the maximum force that may be applied to the base portion if a strong impact force is exerted to the tap.

Other advantageous features of the invention will be apparent from the following description of the preferred embodiment. The invention also concerns a method of securing a tap to a gas, liquefied gas or other fluid vessel, and a vessel having a tap provided with a clamping ring as described above.

BRIEF DESCRIPTION OF THE SEVERAL VIEWS OF THE DRAWINGS

In the accompanying drawings which form part of the specification:

FIG. 1 is a longitudinal sectional view of the tap according to the invention secured to a gas cylinder.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

In FIG. 1, the tap 10 is shown secured to the neck C of a vessel or gas cylinder of which only the upper portion is shown. The tap 10 comprises a tap body 12 having an upper main portion 14 and a lower base end portion 16. The two portions 14 and 16 of the body 12 are integrally formed in one piece with one another and interconnected the one to the other by a weaking zone consisting of a circumferential groove 18 formed in the external surface of body 12.

The body 12 is also provided with a portion 20 extending laterally for connecting the tap 10 to a filling means (not shown) for filling gas into the cylinder or to a consuming device (not shown) of the gas discharged from the cylinder.

A vertical passage 22 of different diameters extends from the upper end to the lower end through the tap body 12 and a horizontal passage 24 is formed in the laterally extending portion 20.

In the vertical passage 22, and more precisely in the main body portion 14, there is provided a main valve assembly 26 of usual construction but comprising an inversed seat valve 28, namely a valve to be opened by axial movement of the actuating rod 30 in a downward direction causing the sealing ring 32, of metal or synthetic material, carried by the actuating rod 30 to move downwardly away from the fixed seat 34.

The seat 34 is formed on a tubular member 36 surrounding the actuating rod 30 and which is received within the vertical passage 22 in the main body portion 14. A sealing assembly 33-1 through 33-6 is disposed within the tubular member 36 about the actuating rod 30 to prevent gas leakage along the actuating rod 30. The tubular member 36 is maintained in position by a gland ring 38 threaded into the longitudinal passage 22 at the upper end of the tap body 12 and an annular retaining member 40 is in threaded engagement with an external thread of the tap body 12 and retains the gland ring 38.

The actuating rod 30 comprises a lower portion 30A and an upper portion 30B interconnected by a coupling 44. The upper portion 30B of the actuating rod 30 has an external thread engaged in an internal thread of the gland ring 38. The lower portion 30A of the actuating rod 30 is provided with a sealing ring 32 but it is noted that, in another embodiment, the sealing ring may also be arranged on the tubular member 36 and the seat may be formed on the lower portion 30A of the actuating rod 30. The lower portion 30A of the actuating rod 30 is provided with an extension 46 which extends downwardly into the portion of the longitudinal passage 22 passing through the base end portion 16 for a reason to be explained later in greater detail. An actuating wheel 58 is fixed to the upper portion 30A of the actuating rod 30.

The base end portion 16 is provided at its lower end with a cylindrical extension 47 having a reduced diameter on which a sleeve 50 is mounted by a threaded engagement 51. Within the sleeve 50 there is provided a check valve assembly 52 comprising a piston 54 having a closed upper end and an open lower end. The piston 54 has at its upper end a metallic or plastic material sealing ring (not shown) for tightly engaging in the closed position of the check valve 52 a sealing surface formed at the lower end of the cylindrical extension 47 and surrounding the lower end of the longitudinal passage 22. A spring 56 is disposed about the piston 54 and urges the piston to the closed position. Between the upper closed end and the lower open end of the piston 54 there are provided a plurality of radial orifices 59 interconnecting the exterior of the piston 54 with the interior thereof. The sleeve 50 has at its lower end an internal thread 50-1 for connection of a plunger tube (not shown) thereto.

It can be seen that the check valve assembly 52 provided at the free end of the base end portion 16 is located within the interior of the gas cylinder when the tap 10 is secured to the cylinder neck.

To open the tap, the actuating wheel 58 secured to the upper portion 30B of the actuating rod 30 is rotated in a direction to move the actuating rod 30 downwardly thereby moving the sealing ring 32 of the primary main valve 28 downwardly away from the fixed seat 34. After opening of the main valve 28 the extension portion 46 of the lower portion 30B of the actuating rod 30 engages the piston 54 of the check valve assembly 52 to move it downwardly away from its seat. When the main valve 28 and the check valve 52 are open gas may flow, in the discharge mode of the operation, through the sleeve 50, the piston 54 and the radial orifices 59 of the piston 54, into the lower portion of the vertical passage 22, and then through the open main valve 28 and through radial holes 36A formed in the annular member 36 to enter the lateral passage 24, or in opposite direction in the filling mode of operation.

When the wheel 58 is rotated in an opposite direction to close the tap 10, the prolongation 46 of the rod 20 is first disengaged from the check valve 52 allowing the check valve to close under the effect of its spring 56 and thereafter the main valve 28 is also closed.

According to the present invention, an external clamping ring 62 surrounds the base end portion 16 of the tap body 12 above the upper surface of the neck C of the gas cylinder. This clamping ring 62 is in threaded engagement with the base portion 16. The ring 62 is adapted to be forcefully tightened by the application of a predetermined torque thereto downwardly against the upper radial surface of the neck C of the gas cylinder about the neck opening so as to maintain the integrity and the tightness of the threaded engagement between the base end portion 16 and the neck C of the gas cylinder in case a strong lateral or axial impact force is exerted to the portion of the tap 10 located exteriorly of the gas cylinder. The clamping ring 62 provides a second load transmission path from the tap body 12 to the vessel and thereby limits the magnitude of pulling out forces applied to the base end portion 16 when a high impact force is applied to the tap.

More particularly the base end portion 16 has a first conical thread 16-1 by means of which the base portion 16 is tightly threaded into a corresponding conical thread of the opening of the neck C of the gas cylinder. The base end portion 16 has a second cylindrical thread 16-2 provided above the first conical thread 16-1 between the first thread 16-1 and the main portion 14 of the body 12 and below the weakening groove 18. The second thread 16-2 has a base diameter which is slightly larger than the maximum external diameter of the first conical thread 16-1 and the second thread 16-2 has a finer pitch than the first thread 16-1 but of the same direction as the first thread 16-1.

The clamping ring 62 is provided in the embodiment shown in the drawings with a first upper portion 62-1 provided with an internal thread 62-2 and a second lower portion 62-3 that is not internally threaded and having a lower, generally radial engagement surface 62-4 for engaging the upper surface of the neck C of the gas cylinder when the clamping ring 62 is tightened against the neck C of the gas cylinder. The clamping ring 62 is provided with one or more radial passages 62-5 traversing the thickness of the ring 62. This or these passages 62-5 permit to quickly and easily detect any leakage through the threaded engagement of the neck C of the gas cylinder and the base end portion 16. If multiple passages 62-5 are provided, they may be spaced from one another in circumferential direction. The ring 62 is adapted to be tightened by means of a tool (not shown) for engaging one or more of these passages 62-5. The passages 62-5 open into an internal circumferential groove 62-6 provided between the upper portion 62-1 and the lower portion 62-3 of the clamping ring 62. However, for tightening the ring 62 it may also have an external hex-shape or any other appropriate form. The passages 62-5 may be radial holes disposed between the two opposite ends of the ring 62, or radial slots (not shown) formed in the lower radial surface of the clamping ring 62.

It is noted that the internal diameter of the lower portion 62-3 of the clamping ring is only slightly larger than the maximum external diameter of the conical thread 16-1 and generally equal thereto. It is sufficient for the internal diameter of the lower portion 62-3 of the clamping ring 62 to be slightly larger than the maximum external diameter of the conical thread 16-1 to permit axial displacement of the ring 62 on the base end portion 16 for securing the tap 10 to the vessel or removing it there from. The minimum internal diameter of the thread 62-2 of the ring 62 is slightly larger than the maximum external diameter of the conical thread 16-1.

The clamping ring 62 is accordingly centered about the base end portion 16 and adapted to be tightened firmly against the neck C of the gas cylinder so as to protect the base end portion 16 and avoid its deformation or shearing-off of the threads in case of application of a strong impact on the tap 10 causing deformation or shearing-off of the tap at the location of the weakening zone (groove 18).

The weakening zone or groove 18 also limits the application of large pulling out forces to the base end portion 16 by allowing the tap body 12 to be sheared-off at the weakening zone 18 when an impact force of a predetermined magnitude is applied to the tap 10 exteriorly of the vessel. The location of the weakening zone 18 above the threaded engagement between the clamping ring 62 and the base end portion 16 also insures that shearing-off cannot occur at a location closer to the vessel neck which would be detrimental to the integrity of the clamping ring 62 and the effect obtained thereby.

The clamping ring 62 can be used in a tap 10 with or without active check valve 52. Instead of the active check valve 52 a non-active check valve may be provided, as described hereinbefore.

The presence of the clamping ring 62 avoiding deformation or damaging of the threaded engagement between the base end portion 16 and the gas cylinder to prevent leakage through the threads about the base end portion 16 is very advantageous in combination with the use of the active or non-active check valve 52 as the advantage obtained by the check valve 52 would at least be partly off-set if after shearing-off of the tap body 12 the contents of the gas cylinder are prevented by the check valve 16 from flowing out through the normal flow passage 22 of the base end portion 16 but leakage would nevertheless be possible about the base end portion 16 through the threads of the base end portion 16 and of the neck C of the gas cylinder.

The construction of the main primary valve 26 and the construction of the check valve 52 is not essential to the invention and instead of the particular constructions previously described and shown in the FIGURE for the valve 26 and the check valve 52, any other embodiment can be provided for the valve 26 and also for the check valve 52.

To connect the tap 10 to the gas cylinder the clamping ring 62 is placed about the base end portion 16 and threaded on the second thread 16-2 until it is in an axial position (indicated by the dotted lines above the ring 62 in the sole FIGURE) with respect to the base end portion 16 so that it does not interfere with the application of a torque to the tap body 12 for connecting the tap 10 to the gas cylinder, and after having threaded and tightened the base end 16 of the tap body 10 in the threaded opening of the neck C of the gas cylinder by the application of a predetermined tightening torque to the tap body 12, the clamping ring 62 is tightened against the neck of the gas cylinder by application of a predetermined torque to the clamping ring 62.

The invention is not limited to the particular embodiments described hereinbefore but to the contrary, many modifications or variations may be applied thereto by the skilled person without leaving the scope of the annexed claims.

The invention claimed is:

1. A tap for a gas, liquefied gas or other fluid vessel, comprising:

a tap body having a main body portion and a base end portion provided with a first external thread for securing the tap to a neck opening of the vessel and a second external thread between the first thread and the main body portion; and a clamping ring having an internal thread which is in threaded engagement with the second thread, said clamping ring being adapted to be firmly tightened by the application of a predetermined torque thereto against the neck of the gas vessel about said neck opening so as to maintain the integrity and the tightness of the threaded engagement between the base end portion and the neck of the gas vessel in case of application of a strong impact force to the tap body;

wherein said tap body has a weakening circumferential groove judiciously placed with respect to the threaded engagement of the clamping ring with the base end portion; and wherein the weakening circumferential groove is provided between the base portion and the main portion of the tap body, approximately at the end of the clamping ring facing towards the main portion of the tap body.

2. The tap according to claim 1, wherein the second thread has a finer pitch than the first thread but is in the same direction as the first thread.

3. The tap according to claim 1, wherein the second thread is a cylindrical thread.

4. The tap according to claim 1, wherein the first thread is a conical thread and the second thread is located at the large diameter end of the conical thread.

5. The tap according to claim 1, wherein the base diameter of the second thread is slightly larger than the maximum external diameter of the first thread.

6. The tap according to claim 1, wherein the clamping ring has a first internally threaded portion whose minimum internal diameter is slightly larger than the maximum external diameter of the first thread, and a second portion without an internal thread and having an engagement surface for engaging the neck of the vessel about the neck opening, the second portion having an internal diameter which is slightly larger than the maximum external diameter of the first thread.

7. The tap according to claim 1, wherein the clamping ring has at least one passage extending through the thickness of the clamping ring to permit detection of leakage between the threads of the base portion and the neck of the vessel.

8. The tap according to claim 1, wherein the external circumferential surface of the clamping ring is configured for tightening the clamping ring by means of a tightening tool.

9. The tap according to claim 1, wherein the tap is of the type comprising a main valve assembly disposed within the main body portion of the tap.

10. The tap according to claim 9, wherein the tap is of the type comprising a check valve assembly provided at the free extremity of the base portion so as to be located within the interior of the vessel when the tap is secured thereto.

11. The tap according to claim 10, wherein the main valve assembly comprises an inversed seat valve and the check valve assembly is formed so as to be opened by an extension portion of an actuating rod of the main valve assembly when the actuating rod is actuated in a direction to open the main valve.

12. An improved fluid vessel, such as a gas or liquefied gas vessel, having an internally threaded neck opening, the improvement comprising:

a tap having a tap body including a main body portion and a base end portion having a first external thread engaged and firmly secured in said threaded neck opening, said base end portion including a second external thread located between the first thread and the main portion of the tap body; and a clamping ring having an internal thread which is in threaded engagement with the second thread, said clamping ring being firmly tightened against a neck of the gas vessel about said neck opening so as to maintain the integrity and the tightness of the threaded engagement between the base end portion and said neck of the fluid vessel in case of application of a strong impact force to the tap body;

wherein said tap body has a weakening circumferential groove judiciously placed with respect to the threaded engagement of the clamping ring with the base end portion; and wherein the weakening circumferential groove is provided between the base portion and the main portion of the tap body, approximately at the end of the clamping ring facing towards the main portion of the tap body.

13. The improved fluid vessel according to claim 12, wherein the clamping ring has at least one radial passage there through for detecting leakage through the threaded engagement between the base end portion of the tap body and the vessel neck opening.

14. The improved fluid vessel according to claim 12, wherein the second thread has a finer pitch than the first thread.

* * * * *